United States Patent Office 2,769,842
Patented Nov. 6, 1956

2,769,842

PREPARATION OF DYPNONE

Alfred R. Bader, Milwaukee, Wis., assignor to Pittsburgh Plate Glass Company, Allegheny County, Pa., a corporation of Pennsylvania No Drawing. Application September 21, 1953,
Serial No. 381,510

4 Claims. (Cl. 260—590)

This invention relates to a novel method for preparing dypnone, and pertains more particularly to its preparation by treating acetophenone with polyphosphoric acid.

Dypnone, which possesses the structure $$C_6H_5-\underset{\underset{CH_3}{|}}{C}=CH-\underset{\underset{O}{\|}}{C}-C_6H_5$$

is a very valuable compound, being particularly useful as a plasticizer, as a base for perfumes and as an ultraviolet light filter in resins and in surface coating materials. Dypnone has previously been prepared by the action on acetophenone of sodium ethoxide, aluminum chloride and aluminum tertiary butoxide. Yields obtained by the above method have been relatively small.

It has now been discovered that good yields of dypnone can be obtained very readily by contacting acetophenone (also known as methylphenyl ketone, hypnone and acetylbenzene) with polyphosphoric acid. Because of the very low cost of polyphosphoric acid and the good yields obtained, dypnone can be produced by the present process more easily and at a lower cost than has heretofore been possible.

The reaction involved in treating acetophenone with polyphosphoric acid may be depicted structurally as follows:

$$2C_6H_5-\underset{\underset{O}{\|}}{C}-CH_3 \xrightarrow{\text{Polyphosphoric Acid}} C_6H_5-\underset{\underset{CH_3}{|}}{C}=CH-\underset{\underset{O}{\|}}{C}-C_6H_5$$

Acetophenone                                           Dypnone

The polyphosphoric acid with which the acetophenone is contacted to produce dypnone in accordance with the above equation is the reaction product of or a solution of orthophosphoric acid ($H_3PO_4$) and phosphorus pentoxide ($P_2O_5$). It is also termed "a condensed phosphoric acid" and its structure is understood to be:

$$H-(PO_3H)_x-OH$$

or $$H-\left(O-\underset{\underset{\underset{H}{|}}{\underset{O}{|}}}{\overset{\overset{O}{\|}}{P}}\right)_x-OH$$

wherein $x$ is greater than 1. Polyphosphoric acid is an easily handled and relatively inexpensive viscous liquid which contains about 82 to 85 percent of phosphorus pentoxide.

The quantity of polyphosphoric acid utilized in the reaction may be varied widely. Usually, it is preferred to utilize the polyphosphoric acid in an amount in excess of the quantity of the acetophenone employed, the upper limits being imposed by economics rather than by chemical behaviour. Obviously, great excesses beyond those required to obtain reaction merely increase the costs without corresponding improvements in results. Equal amounts of the acetophenone and polyphosphoric acid may also be employed and good results are obtained when an excess of the acetophenone is present.

Preferably, the reaction is carried out in an inert solvent or diluent for the acetophenone and polyphosphoric acid. Both aliphatic and aromatic hydrocarbons are useful for this purpose. Solvents which may be utilized include aliphatic hydrocarbons such as pentane, hexane, heptane, octane, decane, and the like, and aromatic hydrocarbons such as benzene, toluene, aromatic naphthas and the like. The use of a solvent or diluent is not a critical expedient, however, for the reaction proceeds satisfactorily whenever the acetophenone and polyphosphoric acid, both liquids, are brought into effective contact with one another. Stirring of the reaction mixture is desirable, since the polyphosphoric acid and the organic materials present are not completely miscible.

The temperature at which the reaction is carried out may also be varied widely. For example, temperatures as low as 30° C. or as high as 150° C. may be used with excellent results. When a solvent or diluent is utilized, the reaction is preferably carried out at the reflux temperature of said solvent or diluent. In the case of benzene, a preferred solvent, this temperature is about 80° C., and with toluene, about 110° C.

The following examples describe in greater detail the preparation of dypnone by the reaction of acetophenone and polyphosphoric acid. The examples are not intended to limit the invention, however, for there are, of course, numerous possible variations and modifications.

*Example I*

One hundred twenty grams (1.0 mole) of acetophenone, and 300 grams of polyphosphoric acid were mixed with 156 grams of benzene. The resulting mixture was then stirred and refluxed at about 70° C. for 6 hours. Upon distillation of the resulting reaction mixture a good yield of dypnone, a yellowish liquid having a mild, fruity odor and boiling at 246° C./50 mm., was obtained.

*Example II*

Forty-nine grams (0.41 mole) of acetophenone and 106 grams of polyphosphoric acid were added to 60 cc. of benzene. The mixture thus obtained was then refluxed with stirring at about 80° C. for 7 hours. The reaction mixture was then washed with water and distilled at 1 mm. Twenty-five grams of dypnone were obtained.

*Example III*

Example II was repeated except that the acetophenone and polyphosphoric acid were admixed and agitated in the absence of benzene or other inert solvent or diluent. A good yield of dypnone was obtained.

When the above examples are repeated utilizing other inert solvents or diluents, other quantities of the polyphosphoric acid and acetophenone, or other temperatures within the range disclosed hereinabove, dypnone is again obtained in good yields.

The dypnone obtained in the above examples could be used as a plasticizer, as a perfume base, as an ultraviolet light filter or as an intermediate in the preparation of other chemical compounds without further purification being necessary.

Although specific examples of the invention have been set forth hereinabove, it is not intended that the invention be limited thereto, for it will be apparent to those skilled in the art that numerous possible variations and modifications may be made therein without departure from the spirit and scope of the invention as defined in the appended claims.

I claim:

1. The method which comprises bringing together acetophenone and polyphosphoric acid, thereby to obtain dypnone.

2. The method which comprises bringing together acetophenone and polyphosphoric acid in an inert solvent, thereby to obtain dypnone.

3. The method which comprises bringing together acetophenone and polyphosphoric acid in the presence of an inert solvent and at a temperature of about 30° C. to about 150° C., thereby to obtain dypnone.

4. The method of claim 3 wherein the inert solvent is benzene.

References Cited in the file of this patent

Calloway et al.: Jour. Am. Chem. Soc., 59, pp. 809–11 (1937).

Berkman et al.: "Catalysis" (1941), pp. 657–8.